(12) United States Patent
Kuno et al.

(10) Patent No.: US 6,455,809 B1
(45) Date of Patent: *Sep. 24, 2002

(54) RESIN WINDOWS HAVING ELECTRICALLY CONDUCTIVE TERMINALS

(75) Inventors: Hiroshi Kuno; Akiteru Nishio; Kotaro Oami; Yasushi Iimori, all of Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/592,492

(22) Filed: Jun. 12, 2000

Related U.S. Application Data

(62) Division of application No. 09/335,123, filed on Jun. 17, 1999, now Pat. No. 6,103,998.

(30) Foreign Application Priority Data

Jun. 19, 1998 (JP) .............................................. 10-173389

(51) Int. Cl.⁷ .................................................. B60L 1/02
(52) U.S. Cl. ........................ 219/203; 219/541; 219/547
(58) Field of Search ................................ 219/201, 202, 219/203, 541–543, 547–550; 428/201; 439/83, 801

(56) References Cited

U.S. PATENT DOCUMENTS 5,525,401 A   6/1996  Hirmer ........................ 428/210
6,103,998 A * 8/2000  Kuno et al. ................. 219/203
6,103,999 A   8/2000  Nishio et al. ................ 219/203

FOREIGN PATENT DOCUMENTS

| JP | 49-10443 | 1/1974 |
| JP | 58-30308 | 2/1983 |
| JP | 61-47042 | 3/1986 |
| JP | 4-62119 | 2/1992 |
| JP | 5-124060 | 5/1993 |
| JP | 6-170883 | 6/1994 |
| JP | 7-32976 | 2/1995 |
| JP | 8-99610 | 4/1996 |

* cited by examiner

Primary Examiner—Tu Ba Hoang
(74) Attorney, Agent, or Firm—Woodcock Washburn LLP

(57) ABSTRACT

A resin window 1 with a conductor in which a conductor print 3 is interposed between a resin panel 2 and a resin film 4 joined to one side of the resin panel, includes a metal film 6 provided on one side of the resin film 4 that is joined to the resin panel 2. The metal film 6 is connected to a conductor print 3 at a portion thereof and is exposed through an opening 5 formed in the resin film 4. The resin panel 2 has integrally formed fixing pins 7 that protrude to the outer surface side of the resin film 4 through the metal film 6. A terminal 8 is secured to a resin window 1 by heat treating the fixing pins 7 with a mounting base 8a of the terminal 8 made of electrically conductive material being overlaid on the metal film 6.

2 Claims, 6 Drawing Sheets

RESIN WINDOWS HAVING ELECTRICALLY CONDUCTIVE TERMINALS

This application is a Divisional of Ser. No. 09/335,123 filed Jun. 17, 1999, now U.S. Pat. No. 6,103,998.

BACKGROUND OF THE INVENTION

1. Field of the Invention

The present invention relates to resin windows that may preferably be used instead of glass windows for a vehicle, and more particularly, to a terminal mounting structure for a resin window having a conductor, such as an antenna or a defogger.

2. Description of the Related Art

Glass windows having antennas for receiving radio broadcasts and defoggers for preventing window fogging are known. These windows utilize a metal conducting wire disposed within the glass to conduct electric signals or heat to provide useful functions.

An example of a known antenna terminal structure provided on a window 31 is shown in FIG. 12 and a perspective view of part B is shown in FIG. 13. The antenna 32 is formed in the glass window by printing an electrically conductive ink in a predetermined pattern on the interior side of the window shield glass 31 and then baking the ink and glass to harden the ink. A relatively wide conducting portion 33 is formed to contact the antenna 32 in order to provide a sufficient electrical connection between the antenna 32 and a terminal 34, which is mounted on the conducting portion 33 using solder 35. A method for manufacturing a glass window with such a conductor is disclosed in Japanese Laid-Open Patent Publication No. 63-155804.

Recently, resin windows have begun to replace glass windows in automobile in order to reduce the overall weight of the vehicle. However, a useful technique has not yet been developed for mounting an electrically conductive terminal structure on a resin window having a conductor disposed within the resin window.

For example, a conductor could be formed in a resin window using known techniques by printing electrically conductive ink on one side of the resin window and soldering the terminal structure to the conductor. However, solders that have been used for glass windows generally have high melting temperatures. Therefore, such solders can not be used to secure a terminal to a resin panel, because resin panels typically have low resistance to heat. As a result, the resin panel will warp or melt by the application of heat to the resin panel. In the alternative, electrically conductive adhesives or low-melting solder could be used. However, these adhesives and solder usually have inferior bonding strengths and reliability compared to the known high-melting point solders.

A terminal structure also could be provided with holes in the mounting base and to fasten the terminal structure to the resin panel using screws. Unfortunately, cracks may form in the resin panel when driving the screws into the panel. Moreover, if the resin panel vibrates when the vehicle is driven, the screws may loosen.

Therefore, a need exists in the art to provide a resin window having a conducting portion disposed in or on the resin window and having a terminal structure reliably connected to the conducting portion.

SUMMARY OF THE INVENTION

It is, accordingly, one object of the present invention to provide resin windows having terminal structures reliably mounted to conducting portions disposed in or on the resin windows.

Preferably, resin windows having terminal mounting structures are taught, in which the terminal mounting structures are firmly secured the resin windows without using solder or screws. Preferred methods for manufacturing resin windows having a conducting portion disposed in the resin window and for attaching a terminal structure the conductor also are taught. These manufacturing methods overcome manufacturing problems caused by resin windows having low heat resistance and susceptibility to cracking.

Other objects, features and advantages of the present invention will be readily understood after reading the following detailed description together with the accompanying drawings and the claims.

DETAILED DESCRIPTION OF THE INVENTION

Figure 1:
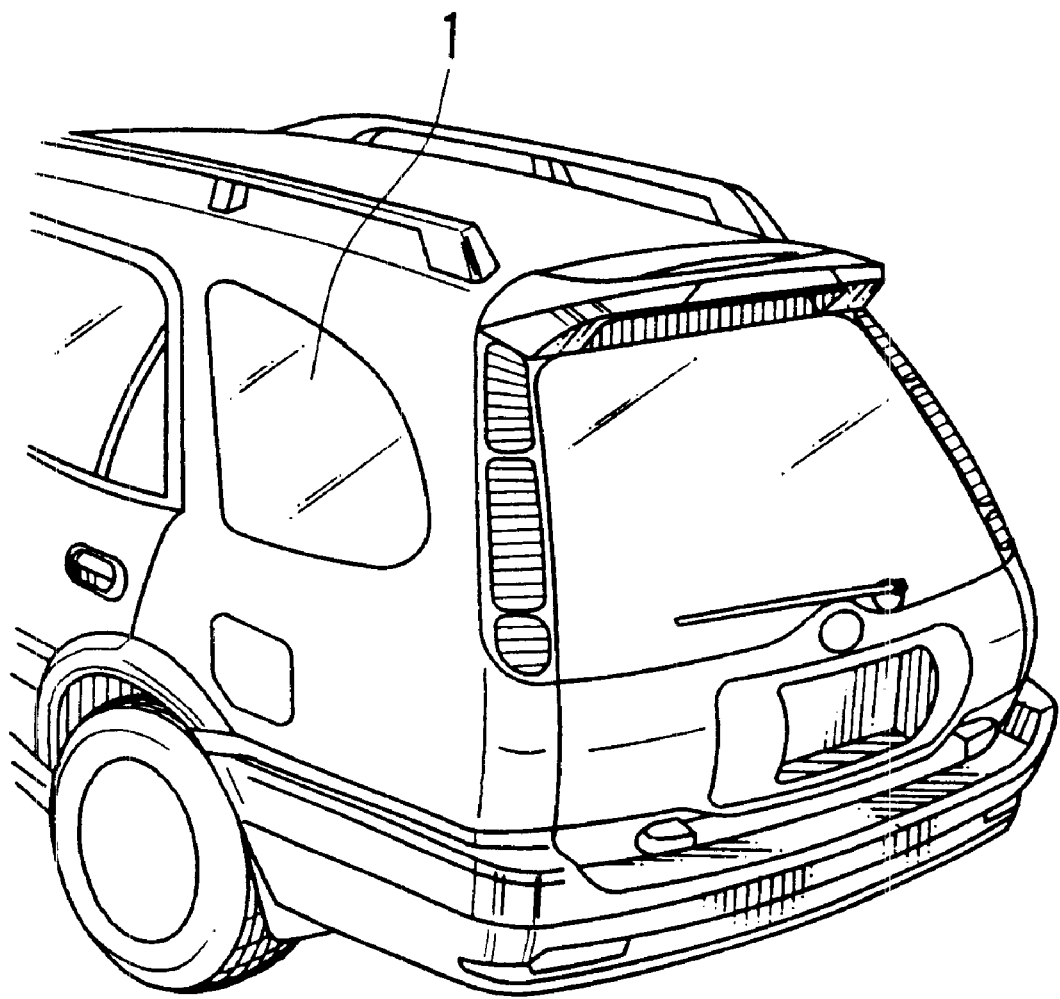
FIG. 1 is a perspective view of a vehicle, as seen from the rear, showing a quarter window.

In a first aspect of the present teachings, a structure for mounting a terminal structure to a resin window is taught. Preferably, the resin window comprises a resin panel and a conducting wire or other structure (hereinafter "conductor") disposed either inside the resin window or on the surface of the resin window. The conductor may be used, for example, as an antenna or defogger. A conducting portion is preferably connected to the conductor and disposed on the surface of the resin panel. Most preferably, the terminal structure is mounted on the conducting portion using fixing pins that are integrally formed with the resin panel. The fixing pins preferable extend outward from the surface of the resin panel and the fixing pins are proximal to the conducting portion. The terminal may be secured to the conducting portion and the resin panel by inserting the fixing pins into apertures or mounting holes in the terminal. The tips of the fixing pins are then preferably heated to soften the tips and the tips of the fixing pins are molded to cover the apertures, thereby securely fastening the terminal to the resin window. Preferably, the terminal has a mounting base made of an electrically conductive material, which material contacts the conducting portion.

If a resin window is constructed according to this first aspect, heat is applied only to the tips of the fixing pins and no significant external force is applied to the resin window during the manufacture of the resin window. Because the mounting base of the terminal is secured to the resin panel by means of the fixing pins that are integrally formed with the resin panel, the terminal structure can be mounted to the resin panel without melting or cracking the resin panel. As a result, a durable terminal mounting structure can be obtained.

In a second aspect, the terminal can be mounted on the resin window by forming a claw structure on the mounting base of the terminal and attaching the claw structures to the resin panel by ultrasonic welding. Thus, the terminal is secured to the resin panel with the mounting base contacting the conducting portion. Because no heat or substantial external force is necessary to construct this embodiment, it naturally shares the same advantages as the previous embodiment.

In a third aspect a structure for mounting a terminal to a resin window is taught in which the conductor is interposed between a resin panel and a resin film joined to the resin panel. Preferably, the terminal is made of an electrically conductive material and is secured to the resin panel by injection molding. The base of the terminal preferably contacts the conductor and an upper portion of the terminal preferably protrudes from the surface of the resin film. Thus, a durable, simple-to-construct resin window is taught.

In the present teachings, the conducting portion is preferably a metal film. If the resin panel is formed by injection molding in a die and if the conducting portion is a thin metal film, the resin panel is less likely to warp during manufacture of the resin window as a result of differences between the linear expansion coefficients of the metal and the resin.

Each of the additional features and method steps disclosed above and below may be utilized separately or in conjunction with other features and method steps to provide resin windows and methods for making such resin windows. Representative examples of the present invention, which examples utilize many of these additional features and method steps in conjunction, will now be described in detail with reference to the drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detail description may not be necessary to practice the invention in the broadest sense, and are instead taught merely to particularly describe representative and representative examples of the invention.

A first representative embodiment will now be explained with reference to the drawings. As shown in FIG. 1, a resin window 1 having a terminal attached to the conductor according to this embodiment can be utilized as a quarter window of a vehicle.

Figure 2:
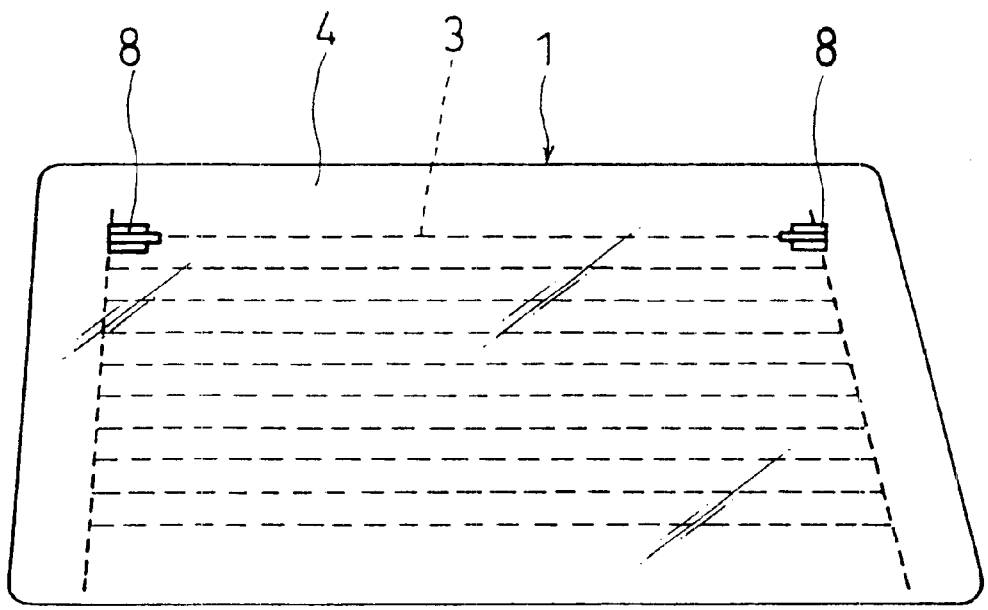
FIG. 2 is a plan view showing a resin window having a conductor disposed in the resin window.
Figure 3:
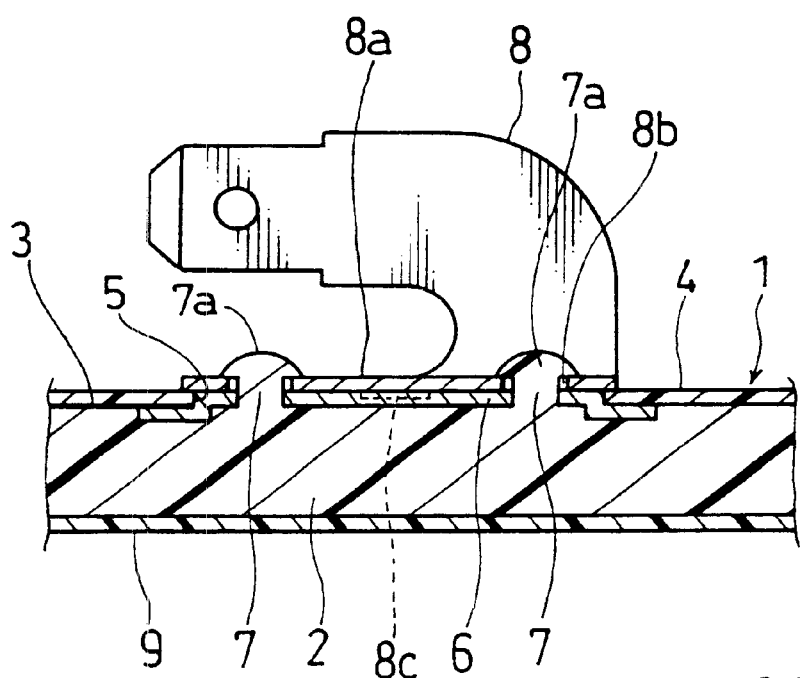
FIG. 3 is an enlarged sectional view of the terminal structure of FIG. 2.

As shown in FIGS. 2 and 3, the resin window 1 comprises a resin panel 2, which resin panel is preferably made of a transparent polycarbonate. A conductor (hereinafter referred to as "conductor print 3") is preferably disposed on a first surface of a resin film 4, which is also preferably made of a transparent polycarbonate. As discussed above, the conductor print 3 can be utilized as an antenna or defogger. A second surface of the resin film 4 is preferably hard-coated and is attached to a first surface (preferably, an interior surface) of the resin panel 2. The first surface of the resin film 4 is preferably positioned such that the conductor print 3 is disposed inside.

The resin film 4 can be formed with an opening 5 of a predetermined (for example, rectangular) shape and a terminal 8 can be mounted on the opening 5. A conducting portion 6, which is preferably made of a electrically conductive material, is disposed on the interior surface of the resin film 4 that faces the resin panel 2. The conducting portion 6 serves to electrically connect the conductor print 3 to the terminal 8 secured to the resin panel 2. In this representative embodiment, the conducting portion 6 comprises a metal film or plate.

The metal film 6 is disposed to fill the opening 5 and to contact at least a portion of the conductor print 3. Further, during the manufacturing of this embodiment, the metal film 6 is pushed outward into the opening 5 to thereby become flush with the outer surface of the resin film 4. The metal film 6 preferably comprises copper, aluminum, nickel or a similar material and preferably has a thickness of about 0.05 to 0.2 mm. Other materials and thickness can be utilized as appropriate for a particular design.

In this embodiment, the resin panel 2 preferably has a plurality of integrally formed cylindrical fixing pins 7, which extend through the metal film 6 and protrude from the outer surface side of the resin film 4. The terminal 8 for connecting the conductor print 3 to a feeder (not shown) is mounted to the pins 7. Preferably, the terminal 8 has a plate-like mounting base 8a and the surface area of the mounting base 8a is slightly larger than the exposed area of the metal film 6. The mounting base 8a preferably comprises mounting holes 8b that are formed to correspond to the fixing pins 7, and also has a central protrusion 8c formed on the underside of the mounting base 8a with a flat surface.

During the manufacture of this embodiment, the mounting base 8a is laid on the metal film 6, such that the pins 7 are inserted into the associated holes 8b of the mounting base 8a. In this state, the tip of each pin 7 is heat treated to soften the tips and form a surface that is larger than the surface area of the associated holes 8b. Thus, the terminal 8 is secured to the resin panel 2. The second surface (exterior side) of the resin panel 2 is preferably coated with a resin film 9 to protect the exterior side face of the resin window 1. The resin film 9 is also is preferably made of transparent polycarbonate and its surface is hard-coated.

Figure 4:
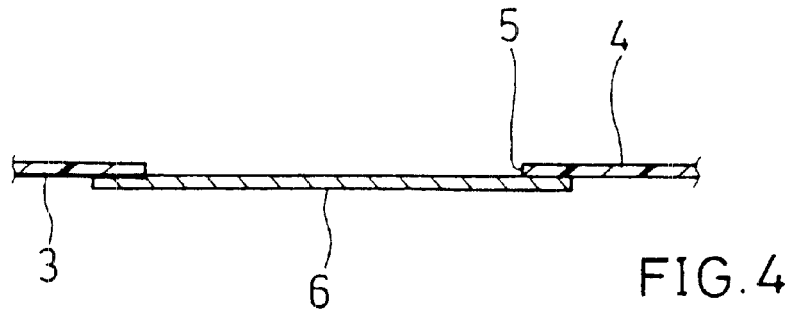
FIG. 4 is a sectional view of a first step in manufacturing a resin window in which a resin film is attached to a conductor print.

A representative process for manufacturing the first representative embodiment will now be explained with reference to FIGS. 4–8. In the first step, a conductor print 3 is disposed in a predetermined pattern on the first surface of the resin film 3 and the second surface is hard-coated. The conductor print 3 can be obtained, for example, by printing conductive ink in a predetermined pattern on the resin film 4 using screen printing techniques. The conductive ink is then preferably baked or dried at a low temperature. An opening 5 of a predetermined shape is then formed in the resin film 4 at an appropriate location. A metal film 6 is disposed on the conductor printed side of the resin film 4 so as to cover the opening 5 and contact at least a portion of the conductor print 3. FIG. 4 shows a resin film 4 having a conductor portion 6 covering the opening 5 and contacting the conductor 3.

Figure 5:
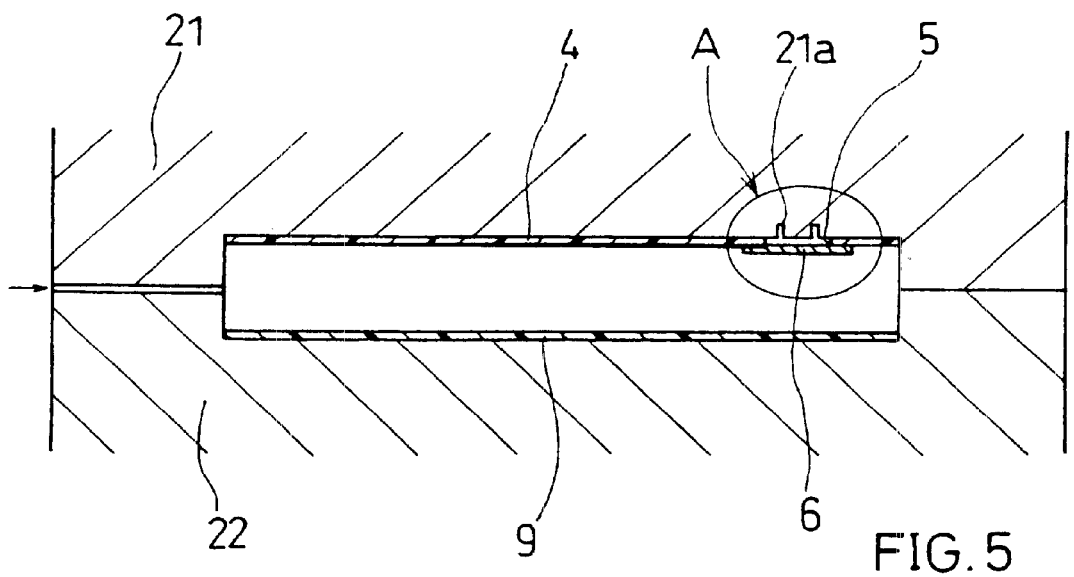
FIG. 5 is an explanatory view of a second step in manufacturing a resin window in which the resin film and conductor print of FIG. 4 are disposed in an injection mold.
Figure 6:
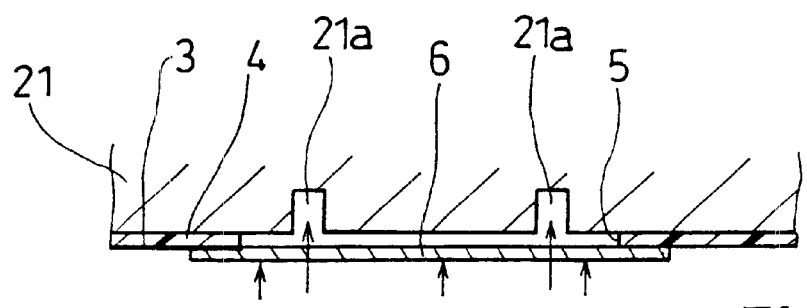
FIG. 6 is a detailed view showing section A in FIG. 5.

As shown in FIG. 5, the resin film 4 is place in an upper die 21 of an injection molding die and held in position using any suitable means. A resin film 9, which is preferably made of polycarbonate has a hard-coated outer surface, is fixed to the lower die 22 of the injection-molding die. The molding die is thereafter closed and the die cavity is filled with liquid or molten polycarbonate. As shown in FIGS. 5 and 6, the upper die 21 preferably comprises a plurality of (for example, four) recesses 21a, each having a circular cross section, formed in the molding surface within the area corresponding to the opening 5 of the resin film 4.

The liquid or molten polycarbonate is preferably forced into the cavity under pressure. As a result, the metal film 6 is pushed outward into the opening 5 and is forced against the molding surface of the upper die 21. The pressurized polycarbonate may tear the metal film 6 at locations corresponding to the recesses 21a of the upper die 21 so that the liquid or molten polycarbonate may fill the recesses 21a. After the liquid or molten resin is set, the die is opened to obtain a plate-like injection molded product, such as the resin window 1 shown in FIG. 7.

According to this molding operation, the metal film 6 is pushed outward into the opening 5a so that the surface of the metal film 6 is flush with the surface of the resin film 4. In addition, the fixing pins 7 are integrally formed with the resin panel 2 when the polycarbonate fills the recesses 21a. The pins 7 extend through the metal film 6 and protrude from the outer surface side of the resin film 4.

If the metal film 6 is thick and/or resistant to tearing, the metal film 6 may not tear as intended. In such a case, starting holes may be formed in the metal film 6 before beginning the injection molding process.

In the above manufacturing method, the resin films 4 and 9 and the molten or liquid resin preferably comprise the same kind of resin material, such as a polycarbonate. As a result, excellent adhesion can be obtained between the resin panel 2 and the resin films 4 and 9. Accordingly, an integrally formed structure can be ensured. However, the resin films 4 and 9 and the molten or liquid resin may comprise different materials.

Figure 7:
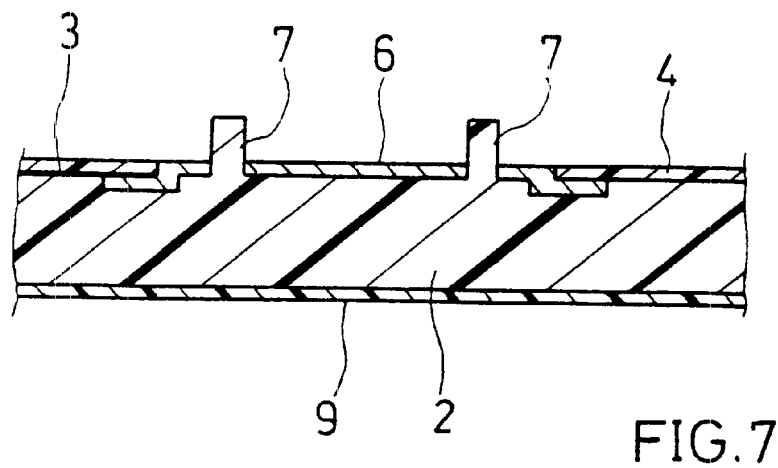
FIG. 7 is a sectional view of a resin window after injection molding.
Figure 8:
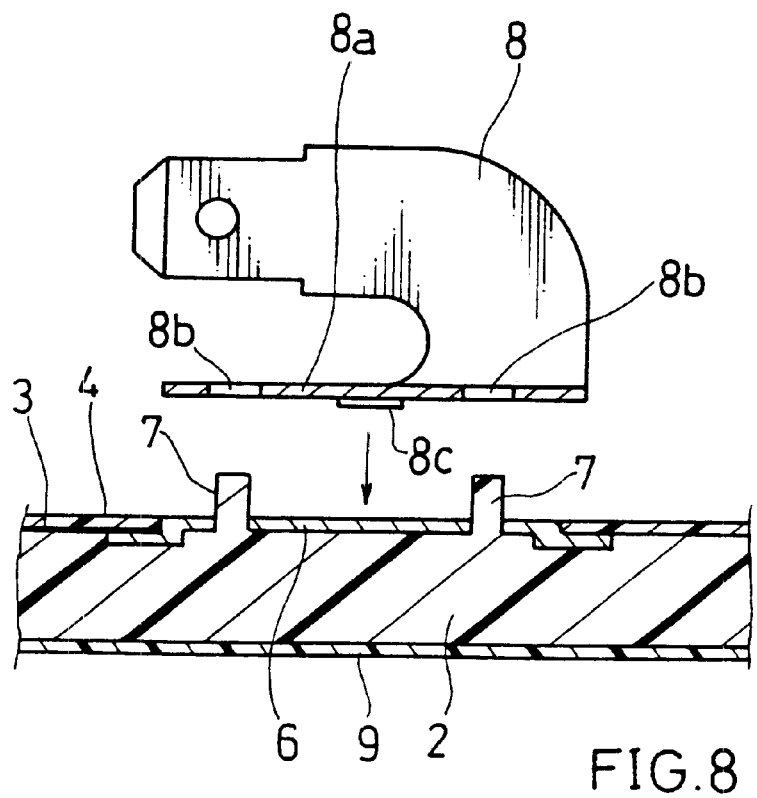
FIG. 8 is an explanatory view showing the operation of mounting a terminal on the resin window.

In order to mount the terminal 8 to the resin window of FIG. 7, the mounting base 8a of the terminal 8 is laid on the metal film 6, such that the fixing pins 7 are inserted through the associated mounting holes 8b in the base 8a, as shown in FIG. 8. The tip of each fixing pin 7 is then treated to form a semispherical head 7a as shown in FIG. 3, preferably using localized heat and pressure, to secure the terminal 8 to the resin panel 2. In this embodiment, the mounting base 8a can be attached to the metal film 6 under pressure to thereby ensure better contact and higher conductivity between the metal film 6 and the terminal 8. Further, in this embodiment, the protrusion 8c is provided on the underside of the mounting base 8a and assists to further increase the pressure that is applied onto the metal film 6. Thus, the protrusion further improves the conductivity between the metal film 6 and the terminal 8.

Preferably, the resin windows are constructed with a hard-coated resin films 4 and 9 on the both interior and exterior surfaces. Therefore, the resin window 1 resists scratches and has improved durability.

One advantage of forming the metal film 6 to be flush with the resin film 4 is that dust or dirt will not collect at the edge of the opening 5, because the metal film 6 is expanded outward into the opening 6. Therefore, the resin film 4 is not likely to separate from the resin window 2. Specifically, if the metal film 6 was recessed with respect to the resin film 4, the resin film might separate as a result of waste or similar materials catching on the edge of the opening 5. In such a case, the conductor print 3 may also separate from the metal film 6, thereby damaging conductivity. On the other hand, such separation problems can be eliminated using the teachings of this representative embodiment, and a reliable resin window 1 can be obtained with excellent conductivity.

However, as long as the conductivity between the metal film 6 and the terminal 8 is ensured, the metal film 6 may be recessed with respect to the resin film 4.

Further, a thin metal film is preferably used for the conducting portion 6, as opposed to a metal plate having a greater thickness, in order to minimize warping of resin panel 2 that may occur due to differences between the linear expansion coefficients of metal and resin. Also, while the fixing pins 7 preferably extend through the metal film 6 and the terminal 8, the fixing pins 7 may be disposed on the opposite lateral sides of the metal film 6, in which case the fixing pins 7 do not extend through the metal film 6.

Figure 9:
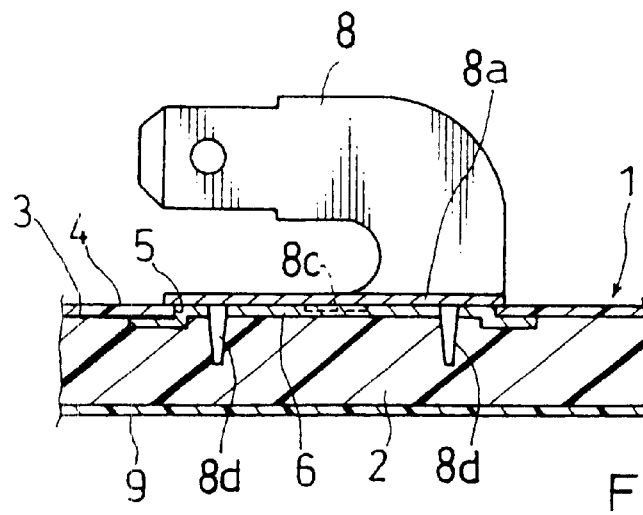
FIG. 9 is a sectional view showing an alternative structure for mounting the terminal on the resin window.

A second representative embodiment will be explained with reference to FIGS. 9 and 10. The terminal mounting structure for securing the terminal 8 to the resin window 1 is a modification of the first representative embodiment. This embodiment can be manufactured using the injection molding process shown in FIGS. 4 to 7, except that the upper die 21 does not have the recesses 21a in the molding surface.

Figure 10:
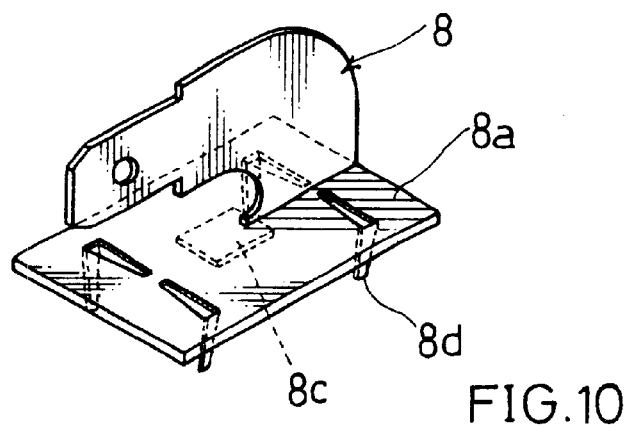
FIG. 10 is a perspective view of the terminal of FIG. 9.

As shown in FIG. 10, the terminal mounting base 8a of the second representative embodiment has a plurality of downwardly projecting claws 8d that are formed by cutting the base 8a and folding the cut portions. In order to mount the terminal 8 on the resin window 1, the terminal 8 and/or the resin window 1 are ultrasonically vibrated. By this operation, the claws 8d are inserted into the resin panel 2 through holes (not shown) in the metal film 6, because the resin is softened by frictional heat produced between the claws 8d and the resin. As a result, the claws 8d are completely inserted into the resin window 1 so that the underside of the mounting base 8a contacts the exposed surface of the metal film 6. Thus, the terminal 8 is secured to the resin panel 2 as shown in FIG. 9.

In this embodiment, starting holes for receiving the claws 8d are preferably formed either during or after the injection molding operation. Further, while the claws 8d preferably extend through the metal film 6, it is not necessary.

By utilizing ultrasonic welding to secure the terminal 8 to the resin window 1, it is only necessary to locally heat the resin panel 2. Further, because screws are not needed to attach the terminal 8 to the resin window 1, the terminal 8 will remain securely attached to the resin window 1 for a long time. Therefore, the second representative embodiment provides the same advantages as the first representative embodiment.

Figure 11:
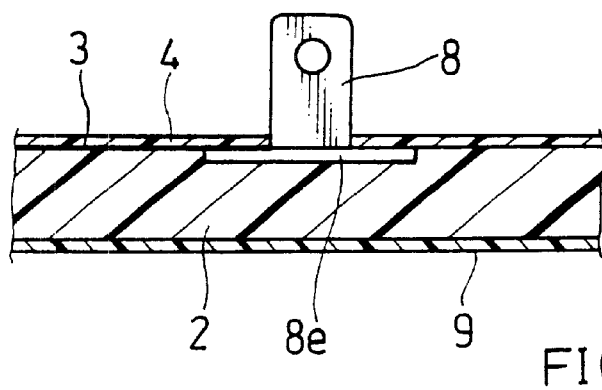
FIG. 11 is a sectional view showing a third representative embodiment.
Figure 12:
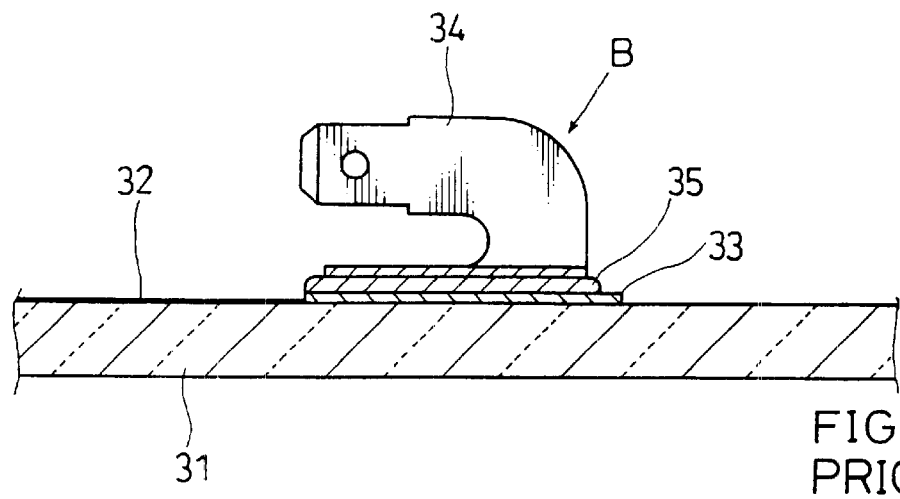
FIG. 12 is a sectional view showing a known glass window having a conductor.
Figure 13:
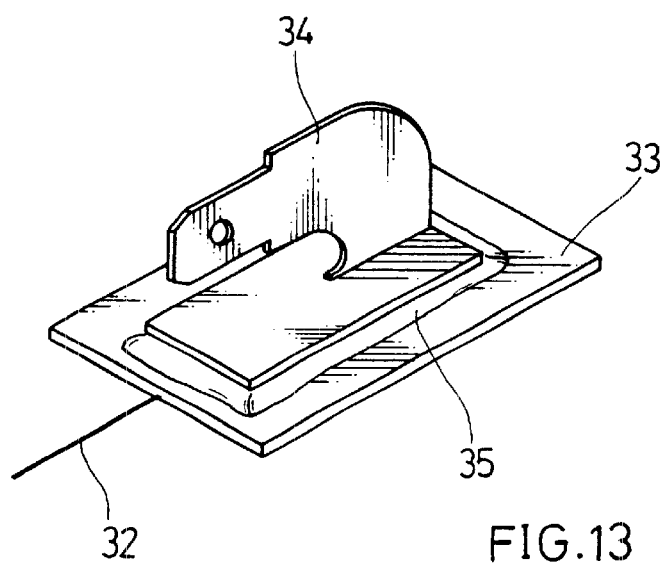
FIG. 13 is a perspective view of part B in FIG. 12.

A third representative embodiment is shown in FIG. 11, in which the terminal 8 is embedded in the resin panel 2 when the resin window 1 injection molded. As shown in FIG. 11, a base 8e of the terminal 8 contacts the conductor print 3 on the interior side of the resin film 4 that is joined to the resin panel 2. The base 8e is embedded in the resin panel 2 in this state. The upper portion of the terminal 8 protrudes to the outer surface side of the resin film 4 through an opening formed in advance in the resin film 4. This third representative embodiment provides the same advantages as the preceding embodiments. Moreover, in this third representative embodiment, the metal film 6 is not necessary.

In the above representative embodiments, the resin panel 2 and the resin films 4 and 9 have been described as being made of polycarbonate. However, any other compatible resin materials can be used if the resin materials ensure sufficient adhesion of the resin films 4 and 9 to the resin panel 2.

Further, although the conductor has been described as being disposed within the resin window, the conductor can be disposed on the outside surface of the resin film, as disclosed, for example, in Japanese Laid-Open Patent Publication No. 7-032976. The arrangement and structure of the conductor is not particularly limited.

Although the conducting portion has been described as the metal film 6, the conducting portion is not necessarily a metal film and is not limited to the above-described structure. For example, even if the conducting portion is a metal plate and is drawn out from the outer peripheral end of a laminated panel, as disclosed in Japanese Laid-Open Publication No. 63-155804, the present invention can be applied to connect the terminal to the conducting portion only if the panel is a resin window. That is, the structure between the conducting portion and the conductor and the structure of drawing out the conducting portion are not particularly limited.

Although resin to be used for the resin window is preferably transparent, semitransparent or colored resins also may be appropriately used. Further, the present resin windows are preferably utilized as quarter windows of a vehicle. However, such resin windows can be utilized in any vehicle windows, as well as windows for other non-vehicular purposes, such as store windows.

In addition, in the representative embodiments, the terminal mounting fixing pins 7 and claws 8*d* were disposed in a location to extend through the metal film 6. However, they may be disposed outside the corresponding area of the metal film 6, that is, in a location to extend through the resin film 4. In case of the mounting structure by ultrasonic welding, bolts or pins may be used instead of the claws 8*d*.

What is claimed is:

1. A resin window comprising:
    a resin panel having a conductor disposed within the resin panel or on a first surface of the resin panel,
    a conducting portion made of an electrically conductive material coupled to the conductor and disposed on the first surface of the resin panel, and
    an electrically conductive terminal having mounting claws and an electrically conductive mounting base, the mounting claws secured to the resin panel by an ultrasonic weld and the mounting base contacting the conducting portion.

2. The resin window of claim 1, wherein the conducting portion comprises a metal film.

* * * * *